United States Patent [19]

Brunelli et al.

[11] 4,279,033

[45] Jul. 14, 1981

[54] BIDIRECTIONAL TRANSMISSION CIRCUIT FOR INTERLOCKED SIGNALS

[75] Inventors: Romeo Brunelli, Milan; Angelo Casamatta, Cornaredo, both of Italy

[73] Assignee: Honeywell Information Systems Italia S.p.A., Milan, Italy

[21] Appl. No.: 23,050

[22] Filed: Mar. 22, 1979

[30] Foreign Application Priority Data

Mar. 23, 1978 [IT] Italy .............................. 21510 A/78

[51] Int. Cl.³ ............................................. H04L 5/14
[52] U.S. Cl. ........................................ 370/29; 370/4
[58] Field of Search .................... 370/29, 24, 32, 31, 370/4; 364/200; 375/608

[56] References Cited

U.S. PATENT DOCUMENTS

| | | | |
|---|---|---|---|
| 4,049,908 | 9/1977 | Knorpp et al. | 370/29 |
| 4,095,045 | 6/1978 | Johnson et al. | 370/24 |
| 4,112,252 | 9/1978 | Liebler | 370/29 |

Primary Examiner—Douglas W. Olms
Attorney, Agent, or Firm—Lewis P. Elbinger; Carlo Falcetti

[57] ABSTRACT

A circuit for coupling together for bidirectional information communication pairs of devices of a digital data processing system, wherein such communication is effected by interlocked information signals, and wherein there is provided a single lead for the bidirectional transfer of such interlocked signals.

5 Claims, 5 Drawing Figures

BIDIRECTIONAL TRANSMISSION CIRCUIT FOR INTERLOCKED SIGNALS

BACKGROUND OF THE INVENTION

The subject invention pertains to data processing systems and more specifically to the channels or communication interfaces which couple together the various system components.

More specifically, the subject invention pertains to a transmitting and receiving circuit which allows the bidirectional transfer of interlocked signals between two units or elements of a data processing system by means of a single connecting lead.

As is known in the art, data processing systems are composed of several units with specific functions, such as a central processor, a working memory, and peripheral devices, connected to each other by means of a set of leads over which a complex system of electric signals is transferred. A specific meaning is attributed to each signal, depending on the particular lead used for its transmission.

The complex of these leads and signals, together with the electrical, logical, and procedural characteristics to which such signals comply, are called a connection interface. Italian patent applications No. 22812 A/74, filed on May 16, 1974, and No. 27258 A/74, filed on Sept. 13, 1974, both filed by the assignee of the instant application and U.S. Pat. No. 3,303,476, issued on Feb. 7, 1967 under the title "Input/Output Control", provide some examples of connection interfaces between different units of a data processing system. These interfaces, taken by way of example, provide evidence that every prior art interface comprises a considerable number of leads, a number which has an order of magnitude of several tens, for the transfer of information.

A single interface may comprise a first group of leads (for example 8) to transfer data encoded in binary form from a unit A to a unit B, a second group of leads (for example 8) to transfer data encoded in binary form from the unit B to the unit A, a certain number of control leads, to transfer control signals from one unit to the other, a certain number of leads to transfer addresses from one unit to the other, a certain number of leads to transfer status information and, finally, a certain number of leads to transfer timing signals.

The presence of such a large number of interface leads causes substantial problems in terms of cost and space, due either to the dimensions or cost of the cables themselves, and to the dimensions, and cost of the lead terminations; i.e., of the connectors and electrical control circuits.

For a long period, therefore, attempts have been made to remedy these disadvantages by means of many different solutions. For example, a group of leads is used to transfer binary codes, whose meaning is defined by a signal transmitted on a characterization lead.

On this same group of leads can be transferred data, control signals and addresses, and the information nature is defined by a signal transmitted on a given lead which characterizes the information as data, or by a signal transmitted on another lead which characterizes the information as control, etc.

In addition, these signals which characterize the information may also be used as timing signals for such information, thereby achieving a certain reduction in the number of leads required.

Recently, the principle of using, whenever possible, the same lead for the bidirectional transfer of information has been introduced.

For example, a group of leads for the transfer of binary encoded data can be used to transfer information from a unit A to a unit B, and viceversa.

However, such transfer cannot be simultaneous, but must occur at different times in order to avoid interference. For this purpose unidirectional leads must be provided by means of which each unit signals to the other unit that it is using the bidirectional leads to transmit information, thus avoiding possible interference.

Examples of this type of interface, using bidirectional leads, can be found, in addition to the interconnection of separate units of a system, in data processing units formed of large scale integration circuits or microprocessors.

In this case the interconnection between multiple micro-processors makes widespread use of bidirectional communication paths. However, in this case there is no relationship between the information transmitted in one direction and the information transmitted in the other direction: the information transmitted in these two directions is always treated independently of each other.

On the other hand, whenever the information which must be exchanged is interdependent, and in many cases interlocked, thus far separate leads have always been used.

Examples of interlocked dialogue between two units are given by the above mentioned patent applications and U.S. patent. A typical example of interlocked dialogue is represented by the timing diagram of FIG. 4a in the U.S. Pat. No. 3,303,476.

Such diagram shows, for example, that in order to initiate a dialogue, the central processor output provides a signal representing a logical level 1 on the lead SELECT OUT. When such signal is received by the receiving, or peripheral, unit, the latter responds by transmitting a signal representing a logical level 1 on the lead SELECT IN. When this latter signal is received by the central processor, the signal then present on the lead SELECT OUT is restored to representing a logical level zero.

When the peripheral unit detects that SELECT OUT lead is at logical level zero, the signal on the lead SELECT IN also is restored to logical level zero.

Therefore, the two leads SELECT OUT and SELECT IN make possible an exchange of bidirectional and interlocked information.

Other examples of interlocked dialogue found in the above mentioned Figure are the exchange of signals on the two leads SERVICE OUT and SERVICE IN, on the two leads STATUS IN and SERVICE OUT, or on the two wires ADDRESS IN and COMMAND OUT.

This use of two leads selected from a set greater than two for an interlocked dialogue makes it possible either to attribute a specific meaning to the kind of information transferred or to recognize particular conditions under which the exchange of information is made, and, therefore, it is very powerful and efficient; however, it requires a large number of leads and very complex transmission and reception logic.

On the other hand, from a circuit standpoint it would be preferrable to simplify such logic implementing the interlocked exchange of information with pairs of leads independent of one another, but this would require a significant increase in the number of leads in an interface.

This inconvenience is obviated by the bidirectional transmission circuit for interlocked signals which is the object of the subject invention. Such circuit uses only one lead for the bidirectional transfer of signals, and extremely simple and low cost logical transmission and reception circuits.

The invention will be described with reference to the accompanying drawing, wherein:

FIG. 5 is a diagram of a modification of the circuits of FIGS. 1 and 3 in order to illustrate their usage with optical communication systems.

DESCRIPTION OF THE PREFERRED EMBODIMENT

Figure 1:
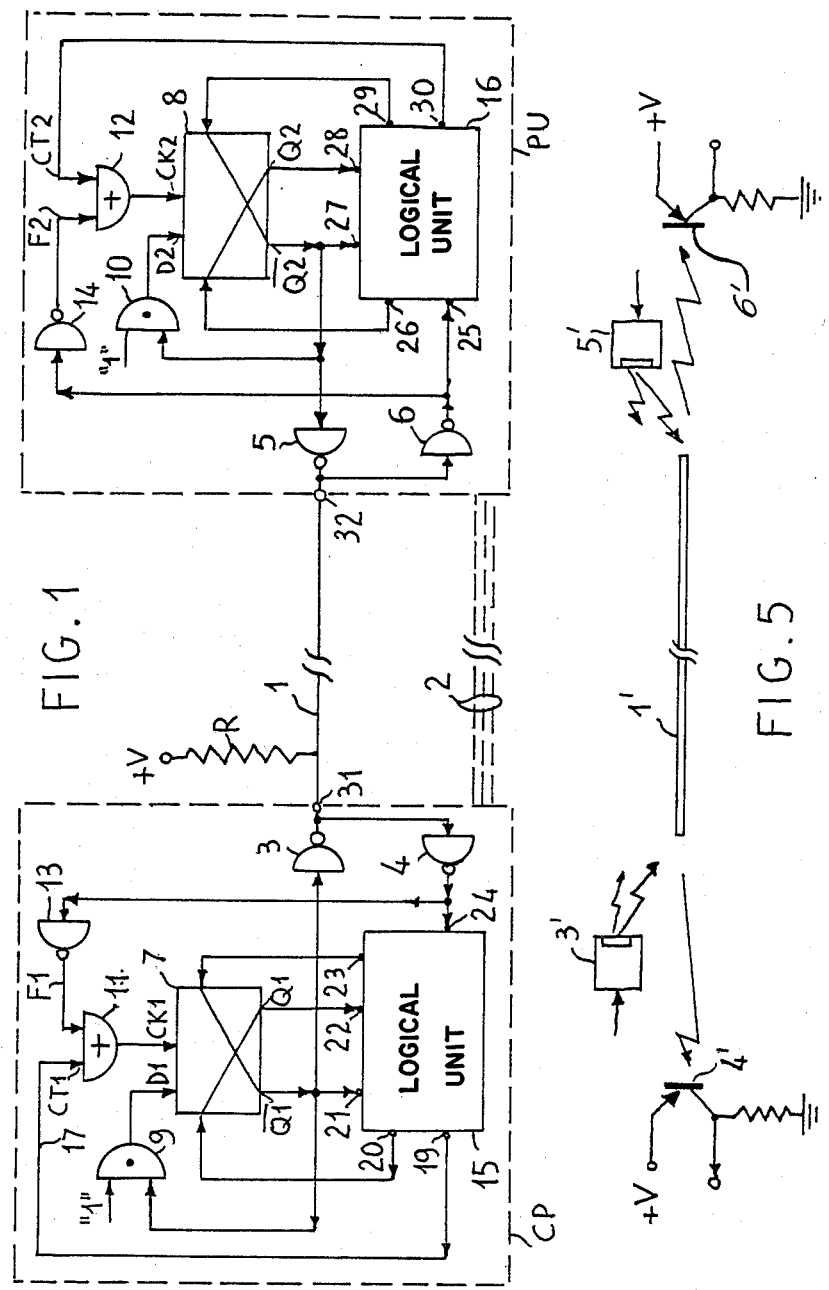
FIG. 1 is a diagram of a preferred embodiment of a circuit for the bidirectional transmission of interlocked signals by means of a single lead.

The circuit of FIG. 1 comprises an information exchange lead 1 for the coupling together of two digital data processing units or devices, shown schematically by the two dotted blocks CP and PU. The two units are coupled to each other not only by lead 1 but also by other leads 2, shown by means of dotted lines and organized in such a way to establish a communication interface. At least one of these leads will be used as ground lead, or electrical return lead, for the various circuits established by the other leads.

According to one form of employment of the invention, the CP unit is a Central Processor, and the PU unit is a peripheral unit controlled by the Central Processor. In such employment, lead 1 is used to transfer from the Central Processor to the Peripheral Unit a timing signal SERVICE OUT, and characterizing as data the information which is present on other leads. Lead 1 is also used to transfer from the Peripheral Unit to the Central Processor a signal SERVICE IN, to acknowledge receipt of information, as is described in the above mentioned U.S. patent, or, in the case of the aforementioned applications, as described with reference to the interlocked signals STO and STI.

The lead 1 is coupled to a suitable voltage source $+V$ through a resistor R.

On the CP Central Processor side the lead 1 is connected to the output terminal of a NOT, or inverting, circuit 3, of the "open collector" type, and to the input terminal of an receiver NOT circuit 4.

On the PU Peripheral Unit side the lead 1 is connected to the output terminal of another NOT circuit 3, of the open collector type, and to the input terminal of an receiver NOT circuit 6.

Open collector inverter circuits, such as circuits 3 and 5, in TTL bipolar technology, are manufactured for example by Texas Instruments under the sales code No. Ser. No. 54 H05. They have the characteristic that when they receive an input signal representing a binary 1 logic level (that is to say at an adequate positive voltage) the output terminal becomes coupled to ground though a conducting transistor. On the other hand, when they receive an input signal representing a binary 0 logic level (corresponding to an input voltage virtually equal to zero), the output terminal becomes isolated and rises to the voltage imposed by external voltage sources coupled to the output terminal (in the case of FIG. 1, the voltage $+V$), provided that there are no other ground connections.

The receivers inverter circuits 4 and 6 may be conventional TTL type NOT circuits, sold by Texas Instruments under code No. Ser. No. 54 H04, or some other highly noise immunity type, specifically designed for the function of line receivers. These circuits have a relatively high input impedance. Accordingly, line 1 is at the binary 1 logical level (positive voltage $+V$) only if both NOT circuits 3 and 5 receive an input signal at the binary 0 logical level. If either one of the two NOT circuits 3 and 5 receives a binary 1 input signal line 1 is grounded, that is at binary 0 logical level.

The circuit of FIG. 1 also includes two type "D" flip-flops 7, 8, activated by the positive leading edge of an applied signal.

These flip-flops are sold as integrated circuits, for instance by Texas Instrument under the code No. Ser. No. 54H74.

Flip-flops 7 and 8 have a direct input terminal D, a PRESET input terminal, a CLEAR input terminal, a timing, or clock, input terminal CK, and two outputs terminal, Q and $\overline{Q}$.

A binary 0 input impulse, applied to the CLEAR input terminal, places the flip-flop in the clear state, or binary 0, state, that is with the Q output terminal at the binary 0 level and the $\overline{Q}$ output terminal at the binary 1 level.

A binary 0 pulse applied to the PRESET input terminal transfers the flip-flop to the set, or binary 1 state, wherein the Q output terminal is at the binary 1 level and $\overline{Q}$ output is at the binary 0 level.

The leading edge of a pulse applied at the clock input terminal causes the flip-flop to transfer to or continue in the logical state of the signal then present at the input terminal D.

Other characteristics and details relative to such flip-flops can be determined from the manufacturer's technical sheets.

The circuit of FIG. 1 also includes two AND gates 9, 10; two OR gates 11, 12, and two NOT circuits 13, 14. NOT circuits 13, 14 may be the above mentioned circuits marketed by Texas Instruments with the code No. Ser. No. 54H04.

AND gate 9 and 10 may be those marketed by Texas Instruments with the code No. Ser. No. 5408 OR gates 11 and 12 may be those marketed by Texas Instruments with the code No. Ser. No. 5432. The two-input AND gate 9 has one input terminal permanently coupled to a binary 1 signal source of and the other input terminal connected to the terminal output Q1 of flip-flop 7. The output terminal of AND gate 9 is connected to the input terminal D1 of flip-flop 7. The two-input AND gate 10 has one input terminal permanently coupled to a binary 1 signal source and the other input terminal connected to the output terminal Q2 of flip-flop 8. The output terminal of AND gate 10 is connected to the input terminal D2 of flip-flop 8.

The two-input terminal OR gate 11 has its output terminal connected to the clock input terminal CK1 of flip-flop 7. One input terminal of OR gate 11 is connected to the output terminal of the NOT circuit 13, which in turn, has its input terminal connected to the output terminal of the NOT circuit 4. The other input terminal of OR gate 11 is connected to lead 17, which receives appropriate timing signals from a logical unit 15.

The logical unit 15, as a whole, represents the logic of a central processor, which sends and receives appropriate signals to and from the transmission circuit.

As the central processor structure is not essential for the understanding of the subject invention, any description thereof not material to an understanding of the present invention has been omitted.

Terminals 19 to 24 of the central processor communicate with the transmission circuit in order to:

supply a binary 1 CLOCK pulse on terminal 19;

supply to flip-flop 7 a binary 0 PRESET pulse on terminal 20;

supply to flip-flop 7 a binary 0 CLEAR pulse on terminal 23;

receive the signal present on the Q1 output terminal of flip-flop 7 on terminal 21 receive the signal present on the Q1 output terminal of flip-flop 7 on terminal 22;

receive the signal present on the output terminal of the NOT circuit 4 on terminal 24, which signal is the logical inverse of the signal present on lead 1.

The Q1 output terminal of flip-flop 7 is connected to the input terminal of the NOT circuit 3.

A similar circuit is provided on the side of the peripheral unit. The peripheral unit logic, represented by the logical unit 16, and not described except as material to an understanding of the present invention, communicates with the transmission circuit through terminals 25 through 30, in order to:

supply a CLOCK pulse to one input terminal of the OR gate 12 on terminal 30, the output terminal of the OR gate 12 being connnected to the clock input terminal CK2 of flip-flop 8;

supply a CLEAR pulse to flip-flop 8 or terminals 29;

supply a PRESET pulse to flip-flop 8 on terminal 26;

receive the signal present on the Q2 output terminal of flip-flop 8 on terminal 27;

receive the signal present on the Q2 output terminal of flip-flop 8 on terminal 28 receive the signal present on the output terminal of NOT circuit 6 on terminal 25, which signal is the logical inverse of the signal present on the lead 1.

The output terminal of the NOT circuit 6 is connected to the input terminal of NOT circuit 14, and the output of the latter circuit is connected to one input terminal of the OR gate 12.

The Q2 output terminal of flip-flop 8 is connected to the input terminal of the NOT circuit 5.

The transmission circuit is perfectly symmetrical, that is to say the same circuit elements are present both on the CP Central Processor side, and the PU peripheral unit side.

This characteristic makes it possible to exchange the roles between the two connected units; in other words, it is possible to connect two intelligent units, which may exchange their role of control unit, that is of the unit responsible for initiating the transmission of information.

This aspect will be covered subsequently herein.

Assume, now, in the embodiment of FIG. 1 that the CP Central Processor is responsible for initiating the transfer of a signal on the lead 1, whereas the peripheral unit PU is a passive or slave unit, which cannot take any initiative, but only respond to signals present on the lead 1. Under these conditions, when turned on the CP Central Processor will send an initialization signal over terminal 23 to the CLEAR input terminal of flip-flop 7 transferring flip-flop 7 to the binary 0 state, unless it was already in such state.

On the other hand, the slave unit PU will send, when turned on, an initialization signal over terminal 26 to the PRESET input terminal of flip-flop 8, thus transferring flip-flop 8 to the binary 1 state if it was not already in such state.

The operation of the bidirectional transmission circuit described above will be described with reference to the timing diagram of FIG. 2.

Assuming that flip-flop 7 is in the binary 0 state, and flip-flop 8 in the binary 1 state, the logical level present on lead 1 is a binary 0 at both of the terminals 31 and 32, because NOT circuit 3 receives at its input terminal a binary 1 signal, and therefore its output terminal is grounded.

The initial situation, immediately prior to time $T_0$, is therefore as follows:

waveform $F_1$, which represents the logical level of the signal present at the output terminal of NOT circuit 13, is a binary 0; being derived from the signal present on the lead 1 through two inversions.

waveform $CT_1$, which represents the logical level of the signal present at the clock terminal 19, is a binary 0.

waveform CK1, which represents the logical level of the signal present at the clock input terminal of flip-flop 7, is a binary 0.

waveform $D_1$, which represents the logical level of the signal present at the input terminal $D_1$ of flip-flop 7, is a binary 1.

waveform $Q_1$, which represents the logical level of the signal present at the output terminal Q1 of flip-flop 7, is a binary 1.

waveform 31, which represents the logical level of the signal present at the terminal 31 of the lead 1, is a binary 0.

waveform 32, which represents the logical level of the signal present at the terminal 32 of the lead 1, is a binary 0.

waveform $Q_2$, which represents the logical level of the signal present at the output terminal Q2 of flip-flop 8, is a binary 0.

waveform $CK_2$, which represents the logical level of the signal present at the clock input terminal of flip-flop 8, is a binary 0.

waveform $D_2$, which represents the logical level of the signal present at the input terminal $D_2$ of flip-flop 8, is a binary 0.

waveform $F_2$, which represents the logical level of the signal present at the output terminal of NOT circuit 14, is a binary 0.

Finally, waveform CT2, which represents the logical level of the signal present at the clock terminal 30, is a binary 0.

At a given initial instant $T_0$, the logical unit 15 (CP) issues a binary 1 clock pulse, signal $CT_1$.

This signal is transferred through OR gate 11 and appears at its output terminal, with a slight delay corresponding to the propagation time of the OR gate 11.

The signal $CK_1$ thereupon rises to the binary 1 level.

The arrow which, in the timing diagram, leads from the leading edge of the pulse of signal $CT_1$, to the leading edge of the first pulse of signal CK1, shows the interdependence of the two signals.

Figure 2:
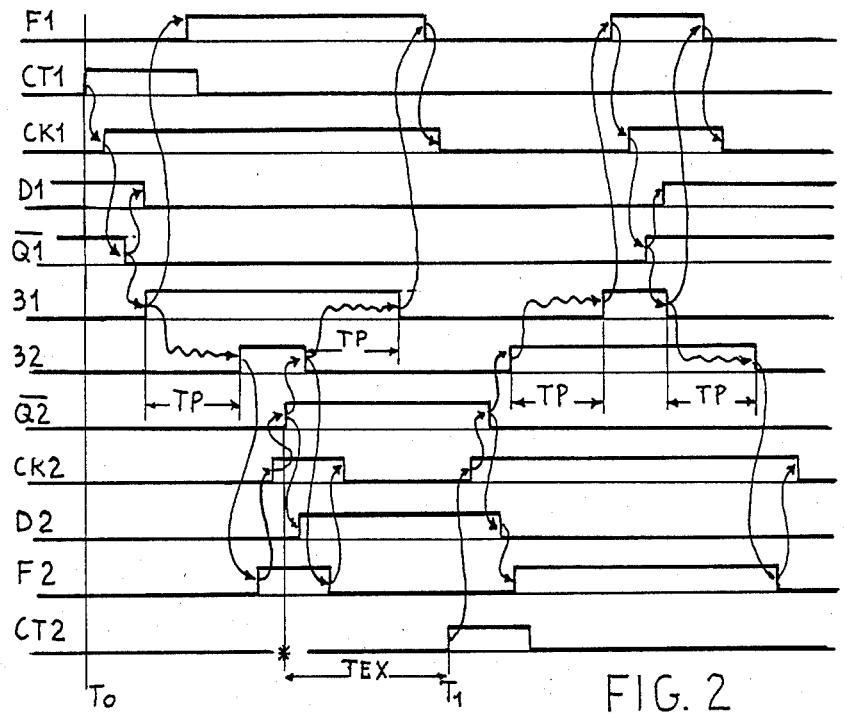
FIG. 2 is a timing diagram of signals which are present at various points in the circuit of FIG. 1.

Other arrows shown in FIG. 2 are similarly employed to illustrate signal relationships.

The leading edge of the pulse of signal CK1, sets flip-flop 7 with a delay depending upon the switching time of said flip-flop. The output signal $Q_1$ of said flip-flop then falls to the binary 0 level.

As a consequence (with a delay due to the propagation time of AND gate 9), the input signal $D_1$, applied at D1 input terminal of flip-flop 7, changes to the binary 0 level, and at the same time (see waveform 31) the input signal 31 of lead 1 rises to the binary 1 level (with a delay due to the propagation time of NOT circuit 3).

As a consequence of the switching to the binary 1 level of the terminal 31, signal $F_1$ rises to the binary 1 level, with a delay due to the propagation time through the two cascade connected NOT circuits 4 and 13. The transfer of signal $F_1$ to the binary 1 level does not affect the clock input of flip-flop 7, which is still at the binary 1 level due to the presence of signal CT1.

At the same time, the signal at terminal 24 of the logical unit 15 falls to the binary 0 level.

This event can be used by the logical unit 15 as a confirmation of the transmission of a call or timing signal toward the peripheral unit PU (for example, the signal ST0 mentioned in the introduction above) has been forwarded to Peripheral unit PU.

The signal represented by the leading edge of the first binary 1 pulse of signal 31 propagates along lead 1 and reaches the terminal 32 (see waveform 32) with a delay TP depending upon the propagation time of lead 1, that is upon its length.

The signal at the terminal 32 rises to the binary 1 level, and, with a delay depending upon the propagation times of the NOT circuits 6 and 14, also the signal F2 rises to the binary 1 level. Therefore, with a delay due to the propagation time of the OR gate 12, also the CK2 signal rises to the binary 1 level and causes flip-flop 8 to transfer to the binary 0 state.

Therefore the $Q_2$ signal rises to the binary 1 level (with a delay with respect to the CK2 signal determined by the switching time of the flip-flop).

Within the peripheral logical unit 16 (PU), the transfer to the binary 0 level of the signal on terminal 25, the transfer to the binary 1 level of the $Q_2$ signal on the terminal 27, or the transfer to the binary 0 level of the $Q_2$ signal on the terminal 28, may be used to acknowledge receipt of a call signal from the central processor (equivalent to the reception of a signal ST0).

It is well known that in a interlocked dialogue a call signal must be answered by an answer signal (for example ST1).

In the circuit of the subject invention, the answer is automatically given on the same lead.

The transfer of flip-flop 8 to the binary 0 state places the output signal $Q_2$ at the binary 1 level, and therefore the output terminal of NOT circuit 5 becomes grounded and the terminal 32 drops to the binary 0 level. As a consequence, the signals $F_2$ and $CK_2$ drop to the binary 0 level, with the delays due to the propagation time, and the lead 1 goes to ground, or the binary 0 level.

After the switching of lead 1 to the binary 0 level at terminal 32, and following a time delay equal to the line propagation time TP, the falling edge of the signal is received at the terminal 31, causing, with the due delay, the lowering of signals $F_1$ and $CK_1$ to the binary 0.

It is in fact assumed that the duration of the clock pulse of signal $CT_1$ for the transfer process is very short, therefore this pulse has at this time disappeared.

The signal present on terminal 24 of the logical unit 15 now rises to the binary 1 level. This rise can be used as confirmation that the peripheral unit has received the call signal sent by unit 15, but it is not necessarily interpreted as an answer of the peripheral unit.

In fact, in the case of interlocked dialogues on more than one lead, an answer signal is sent only upon completion by the peripheral unit of all the operations needed to take into due account the call from the central processor.

The time required to accomplish the above is shown in FIG. 2 as execution time TEX. For example, this can be the time required to load or unload given registers and store the information present on other interface leads 2.

Assuming that these operations are initiated at the moment when the flip-flop 8 is transferred to the binary 0 state, and the $Q_2$ signal rises to the binary 1 level (this moment being denoted by an asterisk in the timing diagram of FIG. 2), after a period TEX, i.e. at the time $T_1$, the logical unit 16 may deliver a clock pulse in signal $CT_2$ in order to activate an answer signal on lead 1.

The transfer to the binary 1 level of signal $CT_2$ causes signal $CK_2$, to rise to the binary 1 level and therefore causes flip-flop 8 to be transferred to the binary 1 state.

Therefore the $Q_2$ signal drops to the binary 0, as well as the signal $D_2$.

Terminal 32 thereupon rises to the binary 1 , level as well as signal $F_2$, and this pulse leading edge propagates along lead 1 with a propagation time TP, until terminal 31 also rises to th binary 1 level.

As a consequence, the signal $F_1$ rises to the binary 1 level as well as signal $CK_1$, and therefore the flip-flop 7, which had its input signal $D_1$ at the binary 0 level, is transferred to the binary 0 state.

Therefore signal $Q_1$ rises to the binary 1 level, as well as signal $D_1$, whereas the signal on the terminal 31 returns to the binary 0 level. As a consequence, both signals $F_1$ and $CK_1$ drop to the binary 0 level, and all the illustrated portions of central processor CP return to their original status, or steady state.

The trailing edge of the signal on lead 1 travels with a propagation time TP from the terminal 31 to the terminal 32, where it causes the drop of signals $F_2$ and $CK_2$ to the binary 0 level.

At this point in time the peripheral unit is reset in also returned to its original steady state.

The above description outlines the following operation:

(A) The central processor sends a call signal to the peripheral unit by raising the level of the signal present on lead 1.

(B) The peripheral unit acknowledge receipt (as for SERVICE OUT) of the call signal by lowering the level of the signal present on lead 1, and setting itself into an active status (flip-flop 8 in the binary 0 state). This operation never occured in the prior art, and represents one additional feature; it does not change at all the status of flip-flop 7, which can be conveniently used by the central processor.

In addition, upon completion of the required operations, the peripheral unit sends an acknowledgement signal by raising the signal level on lead 1 and setting itself into the steady state (flip-flop 8 in the binary 1 state).

This corresponds to the transmission of a signal SERVICE IN.

(C) Upon receipt of this signal, the central processor returns to steady state its interface circuits, which control the lead 1, by lowering the signal level on lead 1.

This corresponds to the resetting of the signal SERVICE OUT.

(D) Upon the lowering of the signal level on lead 1, the peripheral unit goes back to its original status.

This corresponds to the resetting of the signal SERVICE IN. In this way, by means of a single lead, an interlocked dialogue between two units is achieved.

The perfect symmetry of the transmission circuit is to be noted, as well as the identity of the logical transmission/reception circuits of the two units.

This allows an efficient exchange of roles between the two dialoguing units.

It was stated previously herein under the assumption that the CP unit is the controlling unit and the PU unit is the controlled one, that the CP flip-flop 7 must initially be in the binary 0 state, whereas the PU flip-flop 8 must initially be in the binary 1 state.

In order to reverse the roles, it is sufficient to reverse the initial status of the two flip-flops, which makes possible the execution of the dialogue procedure described above, wherein the PU unit becomes the controlling unit that activates the dialogue. If this complete circuit symmetry, is not required then the bidirectional transmission circuit of interlocked signals of the subject invention may be embodied in a simpler way, and the interlocked dialogue may take place in a more concise form.

Figure 3:
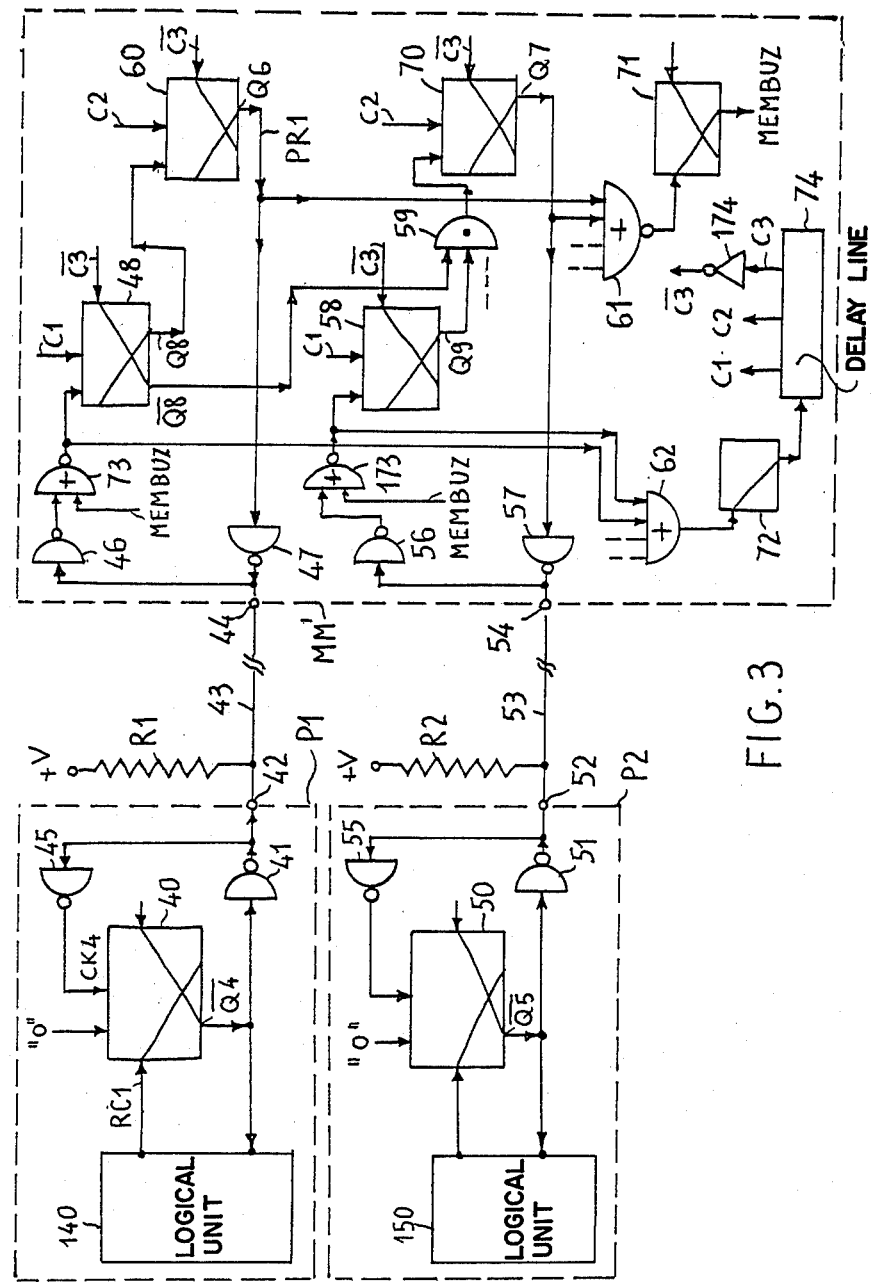
FIG. 3 is a diagram of another embodiment of a circuit for the bidirectional transmission of signals at least partially interlocked by means of a single lead.

This embodiment is represented in FIG. 3.

In order to explain it with an example, reference is made to the use for a priority network with the purpose of allocating memory cycles among several processors which may have concurrent access to the same memory.

In FIG. 3 the two dotted blocks P1 and P2 represent two processors, and the dotted block MM' represents a memory unit which can be accessed by both processors P1 and P2 for read/write operations.

In general, this example may be expanded to a greater number N of processors.

Only the interface circuits, needed to understand the subject invention, are shown in the processors and the memory. These circuits include:

In processor P1:
- a flip-flop 40 of the same kind of and equivalent to the flip-flop 7 of FIG. 1;
- a inverter-driver circuit 41, whose input terminal is connected to the output terminal Q4 of flip-flop 40 and whose output terminal is connected to the input terminal 42 of a signal transmission line 43, which line 43 is connected to the memory MM through terminal 44;
- an inverter-receiver circuit 45, whose input is connected to the terminal 42 and whose output terminal is connected to the clock input terminal CK4 of flip-flop 40; and
- a logical block 140 equivalent to the logical block 15 of FIG. 1.

Circuits 41 and 45 are equivalent to circuits 3 and 4 of FIG. 1.

In the processor P2, which has a structure identical to that of processor P1, are shown the flip-flop 50, the inverter-driver circuit 51, the inverter/receiver circuit 55, and a logical block 150.

A transmission line 53, with terminals 52 and 54, couples processor P2 to the memory.

The lines 43 and 53 are coupled to a positive voltage source +V through resistors R1 and R2 resepctively.

In the memory MM' the terminal 44 is connected to the input terminal of an inverter/receiver circuit 46 (equivalent to circuit 6 in FIG. 1) and to the terminal of an inverter/driver circuit 47 (equivalent to circuit 5 in FIG. 1).

Similarly, the terminal 54 is connected to the input terminal of the inverter/receiver circuit 56 and to the output terminal of the inverter/driver circuit 57.

The output terminals of the circuits 46 and 56 are coupled, by means of NOR gate circuits 73 and 173, respectively, to the input terminals "D" of flip-flop 48 and flip-flop 58, which are the same type as flip-flop 8 in FIG. 1. The circuits 73 and 173 receive a signal MEMBUZ at a second input terminal. When this signal is at the binary 1 level, it denotes that the memory is busy and it cannot accept further access requests.

The direct output terminal Q8 of flip-flop 48 is connected to the input terminal "D" of flip-flop 60, and the direct output terminal Q9 of flip-flop 58 is coupled to the input terminal "D" of flip-flop 70 by means of AND gate circuit 59.

AND gate 59, with two input terminals receives at a second input terminal the output signal Q8 of flip-flop 48. Therefore the output signal of the AND circuit 59, normally at the binary 0 level, rises to the binary 1 level when the following conditions occur:

(A) flip-flop 58 is in the binary 1 state; and
(B) flip-flop 48 is in the binary 0 state.

When the latter condition occurs, that is flip-flop 48 is in the binary 0 state this denotes that there is no pending request from processor P1 for access to memory, and therefore the processor P1 has priority over the processor P2.

In general, in the case of N processors with decreasing priorities, the request from the nth processor $(1<n\leq N)$ will depend upon the absence of requests with higher priority made by the $(n-1)$ processors with higher priority than the n-th one.

The direct outputs leads Q6 and Q7 of flip-flops 60 and 70 are respectively connected to the input leads of the inverter/driver circuits 47 and 57.

They are also connected (along with the direct outputs of other flip-flops equivalent to flip-flops 60 and 70, in the case the number of processors is $N>2$) to an input terminal of a NOR gate 61, whose output terminal, connected to the set input terminal of a flip-flop 71. Accordingly, when any of the flip-flops 60, 70 or an equivalent changes to the binary 0 state, flip-flop 71 is transferred to the binary 1 state.

The flip-flop 71 is used to activate a memory cycle, and its output signal Q generates the signal MEMBUZ with a binary 1 level when a request for memory access is acknowledged and a memory access cycle is initiated.

Flip-flop 71 is reset to the binary 0 state at the end of every memory cycle by circuits which not shown here, not being pertinent with the subject invention. The output terminals of the NOR circuits 73 and 173 are also connected, in addition to the flip-flop 48 and 58, respectively, to the input terminals of an OR gate 62, along with the output terminals of other equivalent receiver/inverter circuits of other processors.

The output terminal of OR gate 62 is connected to the input of the "one-shot circuit" 72 (like, for example, TEXAS Ser. No. 54122), which generates a positive output pulse of suitable duration when triggered by the leading edge of an input signal.

The output of the one shot 72 is connected to a tapped delay line 74, which has three taps C1, C2 and C3.

Tap C1 is connected to the clock input terminals of flip-flops 48 and 58. Tap C2 is connected to the clock input terminals of flip-flops 60 and 70. Tap C3 is connected coupled to the clear input terminals of flip-flops 48, 58, 60 and 70 by means of an inverter 174.

Figure 4:
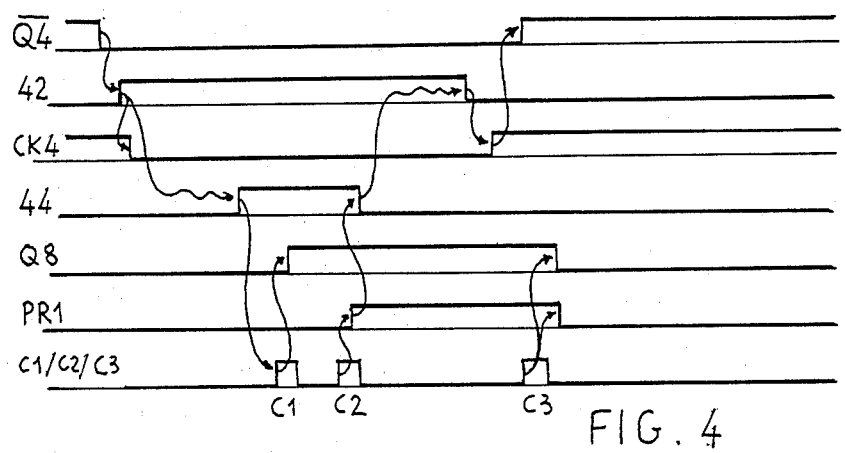
FIG. 4 is a timing diagram of signals present at various points in the circuit of FIG. 3.

To simplify the drawing, these connections are not shown in full. The operation of the bidirectional communication system of FIG. 3 will be described with reference to FIG. 4. If the processor P1 requires access to the memory MM, it transfers the flip-flop 40 to the binary 1 state by means of a signal RC1 issued by the logical block 140 and applied to the set input terminal of flip-flop 40.

The output signal Q4 of flip-flop 40 then falls to the binary 0 level (see waveform Q4). As a consequence, the terminal 42, initially at the binary 0 level rises to the binary 1 level (see waveform 42). Assume, at this time, that flip-flop 60 was initially in the binary 0 state, and therefore the driver circuit 47 has an open output (equivalent to binary 1 level).

Therefore the signal applied to the clock input terminal CK4 of flip-flop 40 falls to the binary 0 level (see waveform CK4).

The leading edge of the signal on line 43 propagates to terminal 44, in the time interval TP (see waveform 44), and changes to the binary 0 level the output signal of inverter 46.

Therefore, if there is no signal MEMBUZ, or as soon as this signal falls to the binary 0 level, the output signal of NOR gate 73 rises to the binary 1 level, and in so doing triggering the one shot 72 by means of OR gate 62.

The triggering of the one shot 72 determines the activation of the delay line 74 and the generation of the pulse C1. The C1 pulse enables switching flip-flops 48 and 58 and other equivalent flip-flops, if these flip-flops, have an input "D" signal at the binary 1 level.

Therefore the signal Q8 at the direct output terminal Q8 of flip-flop 48 rises to the binary 1 level (see waveform Q8).

At the same time, the output signal Q8 falls to the binary 0 level and inhibits AND gate 59 (as well as other equivalent circuits, should there be more than two processors), so that no interrupt request submitted by the processor P2 (and any other processors with a lower priority level) can be acknowledged.

The setting of flip-flop 48 into the binary 1 state causes the application of a binary 1 level signal at the "D" input terminal of flip-flop 60 and therefore the switching of flip-flop 60 when the latter receives a pulse C2 at its clock input terminal.

The direct output terminal Q6 of flip-flop 60 rises to the binary 1 level generating a signal PR1 (see waveform PR1) which by means of the NOR gate 61 sets flip-flop 71, and also, by means of the driver/inverter circuit 47 causes terminal 44 to fall to the binary 0 level. The signal MEMBUZ now rises to the binary 1 level, the the output signal of driver circuit 47 falls to the binary 0 level as well as the terminal 44, and the receiver/inverter circuit 46 rises to the binary 1 level.

At the same time the binary 0 level propagates along line 43 from the terminal 44 to the terminal 42 with a propagation time TP. The delay line 74, with appropriate delay, produces an output pulse on tap C3, which pulse is used, by means of the inverter 174, to restore to the binary 0 level flip-flops 48 and 60, through the CLEAR input terminals. Once the binary 0 level has been transferred from the terminal 44 to the terminal 42, a positive leading edge signal is applied to the clock input terminal CK4 of flip-flop 40 by means of the receiver/inverter circuit 45 (see waveform CK4). Flip-flop 40 thereupon transfers to the binary 0 state.

The output signal Q4 rises to the binary 1 level, leaving terminal 42 at the binary 0 level.

The circuit described above is then partially interlocked, because the circuits on the side of the processor go back to the steady state as a consequence of an actual dialogue with the memory, whereas on the side of the memory the steady state of the various circuits is achieved through an autonomous reset mechanism which includes the one shot 72 and the delay line 74.

In order to avoid anomalous binary level transitions on line 43, it is necessary that the memory MM resets flip-flop 60 (flip-flop 70 if the exchange of signals has taken place on lines 53) only when the circuits on the processor side (and, in particular, flip-flop 40 or the equivalent flip-flop 50) have been reset.

In other words, it is required that the delay line 74 delays the generation of the impulse C3 by a time longer than the propagation time TP of a signal along the transmission line 43 (or 53).

Having described some preferred forms of implementation of the subject invention, where the exchanged signal is electrical, it is to be noted the bidirectional transmission circuit of interlocked signals may be used also for communications with non electrical signals, for example with optical signals, or, more in general, with electromagnetic waves.

It is well known that in the field of communications the use of optical fibers as light collectors and connecting systems is becoming more and more popular.

FIG. 5 shows how optical signals may be used in lieu of electrical ones. The description is limited to those elements which are different from the embodiments described above.

In FIG. 5 the connection lead 1 of FIG. 1 is replaced by an optical fiber 1', at whose ends there are disposed photoemitters 3' and 5' and photoreceivers 4' and 6', which replace respectively the driver circuits 3, 5 and receiver circuits 4, 6.

In all the preceding description there has been implicity assumed the following correspondence between binary levels and electrical levels.

positive voltage=binary 1 level zero voltage, i.e. ground=binary 0 level.

This equivalence may be extended to the light conditions, as follows:

positive voltage=binary 1 level=dark zero voltage (ground)=binary 0 level=light.

The elements of FIG. 5 may be used in the circuits described above with the same effect.

In fact, it is sufficient that only one photoemitter be excited for the light collector to transmit light to the two photoreceivers.

The phtoemitter is excited when supplied with an appropriate voltage, corresponding to the binary 1 level. Its behaviour is therefore identical to the driver circuits 3 and 5.

The photoreceivers 4' and 6' can be conveniently replaced by two phototransistors type NPN, with emitter connected to a voltage source +V, and collector coupled to ground by means of a suitable resistor.

In the dark condition the phototransistors have a high internal impedence, and, therefore, their collectors are virtually grounded through the resistor.

In the light condition the phototransistors have a low internal impedence, and, therefore, their collectors are virtually pulled up to the +V voltage, the binary 1 level.

The photoreceivers 4' and 6' behave like the inverter/receiver circuits 4 and 6.

Having described some preferred ways of implementation of the subject invention, it is apparent that a number of alternatives can be designed for the circuits described above, replacing components, changing the circuit connections, for applications which may differ from the ones specifically described above, but without departing from the purpose of the subject invention and the scope of the appended claims.

We claim:

1. Circuit for the bidirectional transmission of signals, at least partially interlocked, between two units connected by means of a signal transmission means, said transmission means being terminated in one of the two units with first means for applying to said trasmissions means either one of two statuses, representative of two logical levels and with second means to detect the status of said transmission means and to provide an indication of said status, In the second unit the transmission means being terminated with a third means for applying to said transmission means either one of the said statuses, and with a fourth means for detecting the status of said transmission means and for providing an indication of said status, the first of said two statuses being taken by the said transmission means only when the said status is concurrently set by said first and third means, the second of said two statuses being taken by said transmission means when the said second status is set by either the first or third means only, comprising:
   a first bistable element for the control of the said first means and capable of assuming a first logical status as a consequence of a control signal received from said first unit, of causing the application, when it is in this first logical status, of said first status to said transmission means, and of resuming a second logical status in response to a change of status of said transmission means detected by said second means, and
   a second bistable element for the control of said third means, capable of assuming a first logical status in response to a status change of said transmission means, detected by said fourth means, and capable of causing the application, when it is in said first logical status, by said third means of the said second status to said transmission means, and further capable to assume a second logical status as a consequence of a reset command generated in said second unit.

2. Circuit for bidirectional transmission of signals at least partially interlocked, as claimed in claim 1, where said transmission means is an electrical line, connected to a voltage source by means of a resistor, and where the first and third means are electronic switches connecting said line to ground.

3. Circuit for the bidirectional transmission of signals, as claimed in claim 1, wherein said transmission means is an optical fibre and said first and third means are photoemitting elements optically coupled to the end points of said optical fibre.

4. Circuit for the bidirectional transmission of signals, as claimed in claim 1 further including delay means in said second unit, said delay means generating a delayed reset command for said second bistable element, in response to a change of status detected by said fourth means.

5. In a digital data processing system comprising first and second digital data processing units, wherein the units communicate with each other by transferring data over communication lines linking together the two units and wherein when communication of data between the units is to occur, said first unit generates a communication initiation signal; an improved circuit for providing notification to said second unit that communication between said units is to be initiated and for providing an acknowledgment to said first unit that said second unit has received said notification, comprising in combination:
   a signal communication means extending between said two units;
   first and second line drivers disposed respectively in said first and second units, each of said line drivers having an input terminal and an output terminal, the output terminal of each of said line drivers being coupled to a respective end of said communication means to provide that said communication means assumes a first binary state when both of said line drivers receive on the input terminals thereof signals representing the same one of a binary state and assumes a second binary state when either one of said signals received by said line drivers does not represent said one binary state;
   first and second bistable elements disposed respectively in said first and second units, said bistable elements in the inactive mode of said data processing system operating in opposite binary states;
   means for coupling said first bistable element to said first line driver to supply a signal to the input terminal of said first line driver representative of the binay state of said first bistable element;
   means for coupling said second bistable element to said second line driver to supply a signal to the input terminal of said second line driver representative of the binary state of said second bistable element;
   first and second detecting means disposed respectively in said first and second units, each of said detecting means being coupled to sense the binary state of said communication means and to deliver an output signal representing the binary state sensed thereby;
   said second detecting means being coupled to said second bistable element to provide for the output signal of said second detecting means to transfer said second bistable element from the binary state in which it is operating to the other binary state when the binary state of said communication means changes from said second binary state to said first binary state; and
   means for applying said communication initiation signal to said first bistable element to transfer said first bistable element from the binary state in which it is operating to the other binary state when said communication initiation signal occurs.

* * * * *